May 26, 1964    M. P. LAUGHLIN    3,134,546
AUTOMATIC CHEMICAL DISTRIBUTOR
Filed Sept. 17, 1962
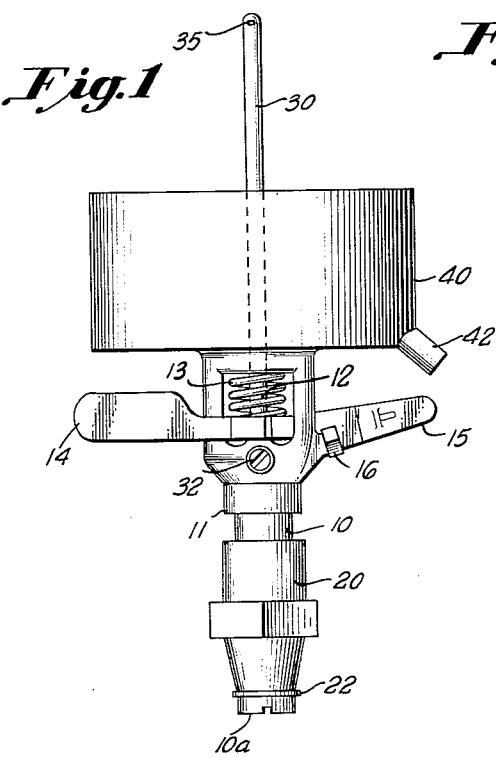
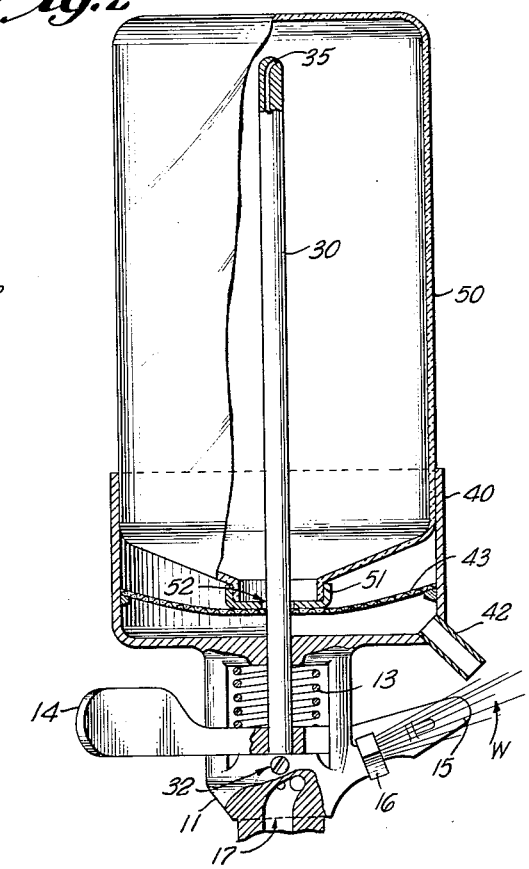
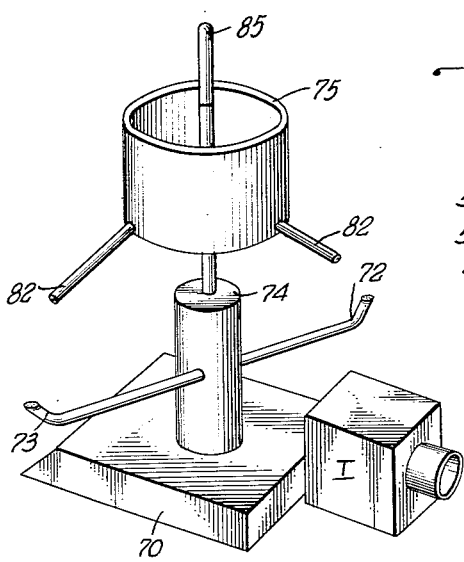
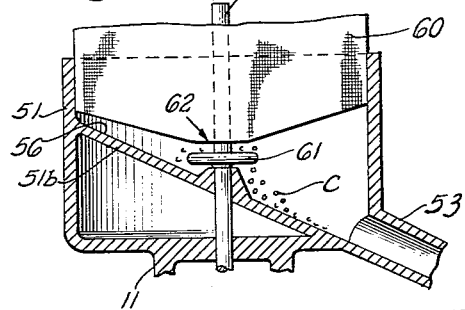
INVENTOR
Myron P. Laughlin
BY George R. Douglas, Jr.
ATTORNEY

United States Patent Office 3,134,546
Patented May 26, 1964

3,134,546
AUTOMATIC CHEMICAL DISTRIBUTOR
Myron P. Laughlin, 1705 Beach Drive SE.,
St. Petersburg 1, Fla.
Filed Sept. 17, 1962, Ser. No. 224,124
1 Claim. (Cl. 239—312)

This invention relates to automatic garden tending and particularly to the application of plant growth chemicals by automatic distribution means. It is an improvement and extension of my application No. 614,315 filed October 5, 1956, (now Patent No. 2,988,849) and of its pendant application No. 91,956 still before the Patent Office. It is specifically directed to the automatic application of plant growth chemicals to plants and areas which for various reasons cannot be subjected to the direct abrasion step employed in my previous application, but which are still greatly benefited by the automatic and correct application of plant growth chemicals in predetermined amounts and without human control while being so correctly applied.

It will be understood by those skilled in the art that the development of modern, highly concentrated fertilizers and herbicides (which have only recently come on the market in quantity) presents problems not existing for the former commercial chemicals, which were commonly sold in bulk packaged with a large bulk of dispersal (inert) matter. Uneven or spotty application of such chemicals tends to burn and destroy the plants treated and in the higher concentrations even correct application much often be closely followed by a thorough wetting operation if the plants are not to be injured. Drift of the often highly volatile chemicals when applied alone often tends to injure surrounding areas as well. This invention provides for automatic, continuous, even spreading of the correct amount of concentrated mixtures with a dispersal agent, simultaneously fed to the same predetermined area and with the automatic application of water or other dispersal agents during and after such application without introduction of human skill or attention.

It is the particular purpose of this invention to provide means for automatically applying predetermined amounts of plant growth chemicals to a defined area and the plants therein in a known period of time.

It is also an object of this invention to "weight" the plant growth chemical as it is fed so as to confine the chemical and its effects to the area treated and thereby abate "drift" to adjacent plantings.

It is an object of this invention to present a garden sprinkler provided with jets through which a substantial quantity of water emits from each jet; to provide such sprinkler in a form which will traverse the stream from such jets over a specified area in a specified time and to provide with such mechanism means which will automatically add to the jet stream the plant growth chemical. Such chemical addition to be made, in the main, after such stream is emitted from the jets so that none of the water handling metal parts are subjected to the corrosive action of the chemicals.

Certain other improved means and purposes will appear as the appended description progresses and by reference to the attached drawings; in which—

FIG. 1 is an elevation of a well known type of jet lawn sprinkler including an embodiment of the present invention.

FIG. 2 is a cross section in part of the device shown in FIG. 1.

FIG. 3 shows a cross section of a further modification of part of the device in FIG. 1.

FIG. 4 shows a further modification of my invention.

Now referring in particular to FIGS. 1 and 2, the impulse portion of the sprinkler form employs a spindle 10 affixed to head 11 supporting bearing pin 12 whereon oscillates a drive lever 14 attached to tension spring 13. Spindle 10 with its head 11 pivots in spindle bearing 20 and is provided with a friction washer 22 which engages the lower end 10a of spindle bearing 20. Drive lever 14 is provided with impulse shoe 15 and oscillates upon pin 12 when the water jet escaping from jet nozzle 16 strikes this shoe. Spindle 10 and head 11 are cored for water passage as at 17 in FIG. 2. The impulse action of such apparatus is well known to those skilled in the art and the blows of the drive lever 14, as it oscillates back and forth under the influence of jet 16 and spring 13, literally hammer the head 11 into motion with spindle 10 revolving in spindle bearing 20. Various limiting and reversing attachments do not greatly affect this primary mode of action.

For the purposes of this invention I modify head 11 by replacing bearing pin 12 with a hollow spindle 30 upon which the drive lever 14 then oscillates. I connect the interior of tube 30 to the main water core 17 in head 11 through a suitable adjustable needle valve 32 and prefer to partially close the upper end of the tube to provide a small jet 35 for purposes which will be described.

Mounted upon and adjacent to head 11 I provide a receptacle 40 which is provided with out-fall tube 42 projecting outward and downward to a point slightly above the center line of jet 16 in such fashion that chemical mixtures falling from this tube fall upon and mix with the water mass W of the ejected jet as it starts its trajectory. To prevent the interference of debris with the outfall I prefer to provide a screen 43 within the receptacle 40.

The chemical to be fed is placed in a package such as a bottle 50 provided with a cap 51 having an orifice opening 52 slightly larger than the outside diameter of tube 30, this orifice serving further to regulate chemical feed. For sales and storage purposes package 50 is substantially filled with chemical and stored with orifice opening 52 closed by a seal patch or the like which is removed when the bottle is inverted and placed over rod 30 with its opening 52 sliding over the rod.

The operation of the apparatus which has been described is extremely simple in that when the water is turned into passage 17 it flows upward therethrough and is discharged through jet 16 operating the driving lever 14 which starts to slowly turn head 11 and spindle 10 guided by spindle bearing 20. A small part of the flow is deflected through needle valve 32, pass upward through tube 30 and be ejected in a fine stream at 35. Container 50 with its contents of chemical is unsealed and inverted over rod 30 so that the water from nozzle 35 begins to dissolve and displace the chemical and feed it through orifice 52 to the cup 40 and thence to out-fall tube 42 where it falls upon, mixes with and is carried by water jet W to the target area of the water jet which in this case includes a predetermined circle of 20 to 50 feet diameter (300–2000 sq. ft. area) surrounding the sprinkler support. It will be appreciated that this automatically determines the area to be treated and allows accurate premeasurement of the required chemical and that the rate of water feed can be proportioned to the chemical fed as desired.

Referring now to FIG. 3 it will be seen that the cup 40 may be replaced with a hopper 51 having a slanted bottom 51b of such incidence angle that dry chemical C will slide theredown and through an out-fall chute 53. In this modification I provide package 60 for the dry chemical and extend the impulse lever bearing pin 12 upward as at 12a providing thereon a feed disc 61 just below discharge orifice 62 of the package 60. The bottom of package 60 rides upon bearing projections 56 of the hopper 51 which in turn rides upon the impulse head 11 which has been described.

The operation of the device in FIG. 3 is as simple as that previously described in that the impulse head is again driven by the drive lever 14 and in this case the granular material in package 60 escapes downward through orifice 62 to the top of disc 61 from which the chemical C is released to the chute 53 from whence it drops upon the water jet as has been described.

It will be understood that package 60 is also actuated by the impulses transmitted through the mechanism parts and moves about with hopper 51 so as to agitate and mix the chemical in said package.

Referring now to FIG. 4 a revolving type sprinkler head having jet arms 72 and 73 rotating on base 70 is shown as provided with a central standard 74 whereon is mounted a receptacle or hopper 75 similar in construction to cup 40 and hopper 51 in the figures previously described. Hopper 75 is here provided with out-fall tubes 82 similarly related to the water jets as shown in W of FIG. 2. When the water pressure is applied the reactive force from jet 72 and 73 produce a whirling motion of the jets carrying hopper 75 and a package placed therein acquires similar rotary motion, and centrifugal force aids gravity in discharging the chemical through out-fall tubes 82. A jet 85 may also be provided as has been described for the soluble chemical previously mentioned. A timer T is also provided as part of the distributing mechanism and may be set when the package is placed in the hopper 75 so as to time the period over which the whole device operates.

It will be manifest to those skilled in the art that the herein disclosed means may, without application of other than knowledge common to those skilled in the art, be applied to other common types of watering devices without departure from the spirit of this invention or the true scope of the appended claim.

What I claim is:

A sprinkler base for providing water mixed with plant growth chemicals for areas wherein known chemical and moisture requirements may be predetermined including:

(a) a calibrated water jet producing means having outflow discharge characteristics and fed from a pressure source;

(b) by-pass passage on said jet producing means;

(c) a chemical mixer tube producing a jet extending from a connection with said by-pass passage, said mixer tube being fed from said pressure source as water discharges through said jet producing means to control the flow through the mixer tube;

(d) a chemical mixer container positioned over said water jet means and receiving the mixer tube wherein predetermined amounts of said plant growth chemicals may be placed for dissolving as required by the specific plant growth area with water received from said pressure source, the discharge portion of the mixer tube being proximate to the end of the mixer container for improving the dissolving of the chemicals as the water is mixed in the mixer container with the chemicals; and (e) a receptacle for the mixer container and having an outfall tube for discharging from said mixer container the mixed solution of chemicals and water produced by the said mixer tube, said outfall tube being positioned for discharging by gravity over the discharge of said water jet.

References Cited in the file of this patent

UNITED STATES PATENTS

| | | |
|---|---|---|
| 1,751,283 | Lowe | Mar. 18, 1930 |
| 1,766,667 | Miller | June 24, 1930 |
| 1,781,292 | McCracken | Nov. 11, 1930 |
| 1,795,875 | Maynard | Mar. 10, 1931 |
| 2,380,101 | Englehard | July 10, 1945 |
| 2,580,629 | Wenzel | Jan. 1, 1952 |
| 2,625,430 | Murphy | Jan. 13, 1953 |
| 2,787,499 | Rolston | Apr. 2, 1957 |
| 2,979,271 | Bayden | Apr. 11, 1961 |

FOREIGN PATENTS

| | | |
|---|---|---|
| 936,137 | France | Feb. 16, 1948 |
| 964,546 | Germany | May 23, 1957 |
| 1,072,379 | France | Mar. 17, 1954 |